United States Patent [19]

Unger

[11] 4,372,644
[45] Feb. 8, 1983

[54] STRIP DIODE LASER WITH REACTANCE FREE FIBER OUTPUT

[75] Inventor: Hans-Georg Unger, Brunswick, Fed. Rep. of Germany

[73] Assignee: Licentia Patent-Verwaltungs-GmbH, Frankfurt, Fed. Rep. of Germany

[21] Appl. No.: 205,241

[22] Filed: Nov. 10, 1980

[30] Foreign Application Priority Data

Nov. 10, 1979 [DE] Fed. Rep. of Germany ....... 2945466

[51] Int. Cl.³ .............................................. G02B 7/26
[52] U.S. Cl. .................... 350/96.20; 350/96.15
[58] Field of Search ............... 350/96.15, 96.17, 96.20; 372/29, 43, 108

[56] References Cited

U.S. PATENT DOCUMENTS 3,803,511  4/1974  Thompson ................... 350/96.15 X
4,143,940  3/1979  Khoe ............................. 350/96.15

FOREIGN PATENT DOCUMENTS 1087822 10/1967 United Kingdom .
1098932  1/1968 United Kingdom .
1140248  1/1969 United Kingdom .
1395093  5/1975 United Kingdom .
1423632  2/1976 United Kingdom .
1464069  2/1977 United Kingdom .
1509831  5/1978 United Kingdom .

OTHER PUBLICATIONS

R. B. Doytt et al, "Preservation of Polarization in Optical Fibre Waveguides with Elliptical Cores", *Electronics Letters*, Jun. 21, 1979, vol. 15, No. 13, pp. 380–382.
V. Ramaswamy et al, "Birefringence in Elliptically Clad Borosilicate Single-Mode Fibers", *Applied Optics*, vol. 18, No. 24, Dec. 15th, 1979, pp. 4080–4084.
R. A. Sammut, "Birefringence in Graded-Index Monomode Fibres with Elliptical Cross-Section", *Electronics Letters*, Feb. 14th, 1980, vol. 16, No. 4, pp. 156–157.
T. M. Kul'kova et al, "Antireflection Coating of Fiber-Optic Elements", *Sov. J. Opt. Technol.*, vol. 42, No. 6, Jun. 1975, pp. 339–340.

*Primary Examiner*—Paul L. Gensler
*Attorney, Agent, or Firm*—Spencer & Kaye

[57] ABSTRACT

A strip diode laser having an optical fiber output free of reactive effects in that an element is inserted between the input of the transmission fiber and output of the laser with the element being one which converts the linearly polarized wave at the laser output to a circularly polarized wave at the transmission fiber input.

7 Claims, 2 Drawing Figures

STRIP DIODE LASER WITH REACTANCE FREE FIBER OUTPUT

BACKGROUND OF THE INVENTION

The present invention relates to a strip diode laser having a glass fiber coupled to its output for transmission of its output signal. More particularly, the present invention relates to an arrangement for coupling the output of strip diode laser to an optical transmission fiber in a manner whereby the coupling is in a reactance free manner.

In glass fiber systems for the optical transmission of data employing semiconductor lasers as the transmitter, reflections at fiber connections and other irregularities in the course of the fiber adversely influence the desired operation of the laser transmitter. Such reflections change the natural frequencies and the life of the photons in the laser resonator and thus also the frequency and amplitude of the individual laser oscillations. Since the glass fibers employed in optical data transmission systems are extremely low in attenuation, reflections occurring at the laser output from remote fiber interference also have a noticeable effect. At the laser output such far away reflections quickly change in phase with the frequency, and experience considerable changes in phase when there are slight time changes in the fiber transmission properties.

As a result of these considerable, and under certain circumstances rapid, changes in phase of the reflections, the oscillation conditions for laser oscillations change approximately to the same degree. This results in fluctuations of the oscillation amplitudes. In the receiver, these fluctuations in amplitude are superposed on the signals with which the laser oscillations were modulated. The modulation characteristics of the laser injection controlled by the signals may experience extensive distortion as a result of the rapidly rotating reflections. As a whole, this noticeably interferes with, or even makes completely impossible, the normal operation of the laser transmitter.

To suppress such interference, the effect of these hardly avoidable reflections on the laser must be eliminated.

SUMMARY OF THE INVENTION

It is the object of the present invention to provide an arrangement whereby the reactive efforts of such reflections on the laser are eliminated.

The above object is achieved according to the present invention, in that in an arrangement including a strip diode laser having an optical fiber coupled to its output for transmission of the output signals of the laser, means are inserted between the input of the fiber and output of the laser for converting the linearly polarized wave at the laser output into a circularly polarized wave at the fiber input.

More specifically, the above object is achieved in that a properly oriented doubly refracting medium is introduced between the output of the laser and the input of the optical fiber used for the transmission of the output signal of laser. The optical axis of this medium is oriented so that it lies transverse to the axis of the laser-fiber system and forms an angle of 45° with the broadside of the strip or stripe cross section of the laser, and the length and index of refraction of this medium are such that a 90° phase difference exists between polarizations perpendicular and parallel to this optical axis.

DETAILED DESCRIPTION OF THE PREFERRED EMBODIMENTS

As indicated above, according to the present invention, the reactive effect on the laser output due to reflections is avoided in that an element or medium is inserted between the input of the optical fiber transmission line and output of the laser so as to convert the linearly polarized wave at the output of the laser into a circularly polarized wave at the input of the optical fiber transmission line for the laser output signal. More specifically, the element introduced between the output of the laser and the input of the optical fiber is a doubly refracting medium. The optical axis of this medium is oriented so that it lies transverse to the optical axis of the laser-fiber system and forms an angle of 45° with the broadside of the strip cross section of the laser. The difference between the index of refraction of this medium for waves which are linearly polarized along the optical axis of the doubly refracting medium and those perpendicular thereto, and the length of this medium in the direction of propagation of the light waves are matched to one another in such a way that a wave which is linearly polarized in the direction of the optical axis, after passage through the doubly refracting medium, will exit with a phase shift in time by exactly 90° with respect to the linearly polarized wave perpendicular thereto.

The doubly refracting element or medium can be realized, on the one hand, by means of a λ/4 disc. Alternatively, it is possible to insert, between the laser and the fiber transmission line a connecting optical fiber of such type that the linearly polarized wave at the laser output is converted into a circularly polarized wave at the input of the optical transmission line.

Figure 1:
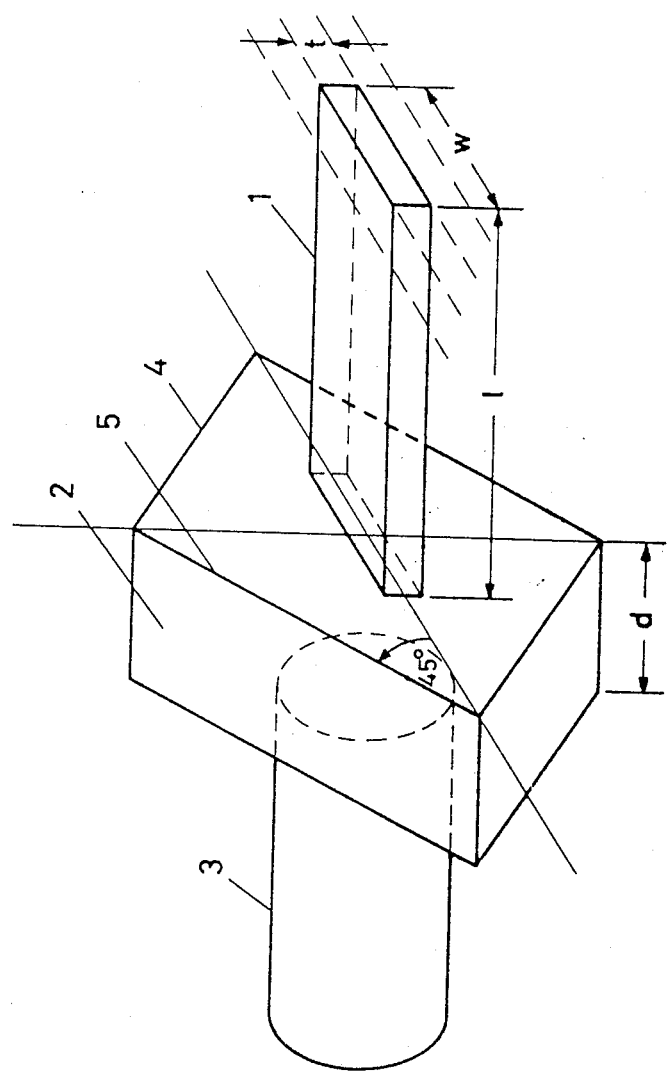
FIG. 1 shows the strip diode laser with non-reactive fiber output using a quarter-wave-plate for polarization conversion. The active strip (1) of the strip diode laser is followed by the quarter-wave-plate (2) and the outgoing transmission fiber (3).

In order to illustrate the strip diode laser with a reactance-free output by means of a quarter-wave-plate, FIG. 1 shows the active strip (1) of the strip diode laser, the quarter-wave-plate (2) and the transmission fiber (3) in their relative positions and orientations one to each other.

Figure 2:
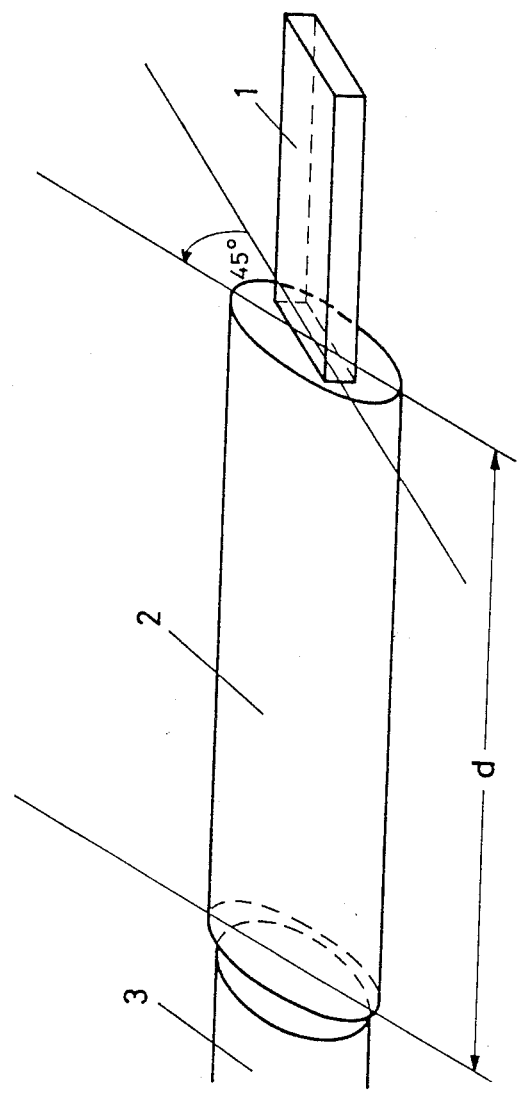
FIG. 2 shows the strip diode laser with non-reactive fiber output using a birefringent connecting fiber inserted between the output of the strip diode laser and the input of the transmission fiber. The active strip (1) of the strip diode laser is followed by the birefringent connecting fiber (2) to which is connected the transmission fiber (3).

For the sake of clarity, only these most essential three parts of the embodiment are shown in FIG. 2 and all constructional details that might be needed to support and fix these parts in their relative positions have been omitted. Also this FIG. 2 shows parts (1), (2) and (3) butt-joined to each other and not including any arrangements in-between, such as matching layers and wave transformers to improve launching conditions and launching efficiency.

The active strip (1) of the strip diode laser has width w, thickness t and length l. It is sandwiched between other semiconductor layers and supported on a semiconductor substrate with epitaxial heterojunctions from layers to strip. Electrodes to bias the laser into operating conditions are also not shown in FIG. 1. Next to the output face of the active strip (1) lies the quarter-wave-plate (2). In FIG. 1 this quarter-wave-plate has rectangular geometry with its principal optical axis parallel to one of its edges (4) or (5). The edges and with them the optical axis of the quarter-wave-plate are inclined at 45 degrees with respect to the broad side of the end face of the active strip (1) of the laser. The quarter-wave-plate does not need to have the rectangular geometry as FIG. 1 shows it. It can also be round or have a geometry that allows it to be more conveniently and securely mounted between laser and transmission fiber. FIG. 1 shows the rectangular geometry with the principal optical axis parallel to one of the edges, only in order to illustrate the orientation of the optical axis of the quarter-wave-plate with respect to the laser strip end face. The dimension d of the quarter-wave-plate is so chosen that its birefringence will cause a phase difference of 90° between polarizations perpendicular and parallel to its optical axis.

The quarter-wave-plate could be made from mica or gypsum or any other anisotropic material that is transparent and has the necessary birefringence at the operating wavelength.

With such an arrangement, the circularly polarized wave is then guided by the fiber transmission line. Any fiber interferences will partially reflect this circularly polarized wave. However, in typical fiber interferences, the reflection is likewise almost circularly polarized, except that now the direction of rotation of the polarization is reversed with respect to the opposite direction of propagation. Strongly reflecting fiber interferences, as for example the jumps in the index of refraction when two fiber sections are connected, have a reflection factor which in its magnitude and phase is independent of the polarization of the fiber wave.

The reflected wave with its circular polarization, which is of the opposite sense of rotation with respect to the reflection causing impinging wave, impinges on the doubly refracting medium at the input of the optical fiber. As the reflected wave passes through this medium in the return direction, the circular polarization is converted into a linear polarization. However, because the sense of rotation of this reflected wave is reversed with respect to the outgoing wave, a linearly polarized wave exits from the doubly refracting medium on the side of the laser with a direction of polarization which is perpendicular to the direction of polarization of the original laser oscillation. Due to the orthogonality of the two polarizations, there is no longer any reactive effect of the reflection on the primary laser oscillation. Whatever the magnitude of this reflected wave at the output of the laser, and however fast its phase changes with frequency and with time, the primary laser oscillation remains uninfluenced by this reflected wave. Its oscillation conditions are stable and its modulation characteristic is unchanged.

In systems with single-wave optical fibers, the reflections caused by far removed points of abutment between fiber sections are particularly annoying. In this case, the reflected fundamental wave is noticeable at the laser output with essentially the full magnitude of the reflection factor. The reactive effect on the laser oscillation is weakened only by the fiber attenuation and by the coupling losses between the laser and the optical fiber transmission.

The present invention therefore is particularly applicable to such systems employing single-wave fiber transmission lines. In the case of such systems, the doubly refracting medium is preferably designed as a fiber which has such a double refraction for its fundamental wave and which is long enough to accomplish the necessary change in polarization. The fundamental wave of this doubly refracting fiber should also have such a field distribution over its fiber cross section that only slight coupling losses occur between the laser and the doubly refracting fiber as well as between the doubly refracting fiber and the singlewave transmission fiber. For this purpose, the field distributions must either be well matched to one another or appropriate transition pieces must be used.

The double refraction for the fundamental wave of the polarization converting connecting fiber can be realized in various ways. One way is to draw this fiber out of a preform which itself has been prepared by the removal of jacket material at two opposing sides, so that the internal mechanical stresses which remain after the drawing process result in double refraction due to tension. Alternatively, the polarization converting fiber may be given an elliptical or oval core cross section.

In the one or the other form, the doubly refracting fiber can be integrated with the laser in a light transmitter with fiber connections.

By way of illustration FIG. 2 shows the active strip (1) of the strip diode laser, a polarization converting connecting fiber (2) and the transmission fiber (3).

The polarization converting connecting fiber is shown in FIG. 2 with an elliptical cross-section. The major axis of the elliptical fiber cross-section makes an angle of 45 degrees with the broad side of the cross-section of the active strip of the laser.

The elliptical cross-section of the polarization converting connecting fiber is meant to indicate that this fiber has birefringence. The orientation of the elliptical cross-section of 45 degrees with respect to the broad side of the active strip indicates that the optical axis of the birefringent fiber must have the same orientation with respect to the laser strip. In order to achieve this necessary birefringence the connecting fiber can be made with an elliptical cross-section as it is described, for example, in Reference 1. Birefringence can also be achieved in form of stress-induced strain birefringence, as Reference 2 describes it. This strain birefringence arises in Reference 2 from the expansion coefficient mismatch between the glass of the elliptical cladding and the glass of the outer jacket. The elliptical cladding of the fiber with strain birefringence is shown in FIG. 2 as the connecting fiber with elliptical cladding cross-section. For the sake of clarity, the outer jacket of the strain birefringent fiber has been omitted in FIG. 2. To obtain the necessary polarization conversion, the major axis of the cladding ellipse of the strain birefringent fiber must make the angle of 45 degrees with the broad side of the laser strip, as FIG. 2 shows it. The length d of the polarization converting connecting fiber (2) in FIG. 2 should in each case be chosen such that at the operating wavelength the birefringence either from the elliptical fiber core cross-section or from the stress-induced strain shifts the phase of the polarization parallel to the optical axis with respect to the phase of the polarization perpendicular to it by 90 degrees.

In optical data transmission systems employing multimode fibers as well, the reflections at far removed points of abutment of the fibers may have an interfering effect at the output of the laser. In this case, however, the reactive effect of such reflections on the laser oscillations is the less the greater the number of fiber waves over which the power emitted by the laser is distributed. Under typical conditions in highly multimode fibers, the laser power is distributed over so many fiber waves, and therefore, the reactive effect of reflections on the laser oscillations is so low, that the present invention relates to such multimode fibers systems only in a secondary way.

In order to accomplish the desired decoupling between reflecting wave components and the laser oscillation in such multimode systems, the doubly refracting medium must convert the output beam as a whole, as it results from the laser oscillation, from linear to circular polarization so that a uniform polarization state exists in the connecting fiber. In order to accomplish this, a doubly refracting gradient fiber, for example, should carry the output beam, if possible, directly as its natural wave. Only the output of this gradient fiber toward the multimode transmission fiber need then be adapted in such a way that the laser beam, if possible, excites only the conducted fiber modes.

With this design of the doubly refracting medium it is assured as much as possible that the circularly polarized reflection in each one of the fiber modes contributes at the laser output to the returning beam wave corresponding to the laser beam only those portions which are linearly polarized and orthogonal to the laser output beam. In this way a reactive effect of reflections on the laser oscillation can be substantially suppressed even in systems employing multimode fibers.

FIG. 2 may also serve to illustrate the strip diode laser with an output into a multi-mode fiber decoupled from reflections in the multi-mode transmission fiber. The connecting fiber (2) with its birefringence for polarization conversion is inserted between the output face of the active strip (1) of the strip diode laser and the input of the multi-mode transmission fiber (3). The connecting fiber (2) should have a refractive index profile that is graded in such a manner that the transverse field distribution and spot size of its fundamental mode are matched to the corresponding quantities of the output light beam of the strip diode laser. Since strip diode lasers commonly have an output beam with a transverse field distribution of nearly Gaussian character, the connecting fiber should have a fundamental mode, which also has a transverse field distribution of this nearly Gaussian character, and its spot size should be the same as that of the output beam of the strip diode laser.

A transverse field distribution of Gaussian character is achieved for the fundamental mode in a graded-index fiber by a parabolic index profile. The connecting fiber should therefore be a graded-index fiber and have a parabolic index profile in which the refractive index decreases with radial distance from the fiber axis following a square law function of radius.

To achieve the necessary polarization conversion this graded-index connecting fiber must have the proper birefringence. One way to obtain this birefringence is to give the graded index profile an elliptical or oval cross-section, such as it is described in Reference 3.

The connecting fiber (2) in FIG. 2 shows this elliptical cross-section and also the proper inclination of the major axis of the cross-sectional ellipse at 45 degrees with respect to the broad side of the active strip of the strip diode laser. The length d of the connecting fiber should be chosen such that the polarization parallel to the major axis of the cross-sectional ellipse shifts in phase by 90 degrees with respect to the perpendicular polarization when transmitted through the connecting fiber. Reference 3 gives the quantitative dependence between the difference in phase constants of these two orthogonal polarizations and the design parameters of the graded-index fiber of elliptical cross-section. From this reference therefore the length of the connecting fiber as well as its other design parameters may be readily obtained for a specific strip diode laser operating at a given light wavelength.

Another way to achieve the birefringence for polarization conversion in the graded-index connecting fiber is strain birefringence induced by stress. Reference 2 explains how stress-induced strain birefringence is obtained in a cladded-core fiber from the mismatch in expansion coefficients of an elliptical cladding and an outer jacket. The same principal may also be applied to cladded-core fibers with a graded-index core. FIG. 2 shows the connecting fiber (2) with elliptical cladding cross-section for stress-induced strain birefringence. In order that the optical axis of the birefringent fiber makes an angle of 45 degrees with the broad side of the active strip of the strip diode laser, the major axis of the cladding ellipse of the connecting fiber (2) must make the same angle of 45 degrees with the broad side of the strip, as FIG. 2 shows it. The amount of birefringence as it obtains from this stress-induced strain birefringence for a connecting fiber of suitable design at a given operating wavelength may be inferred from Reference 2. The length d of the connecting fiber must then be chosen as to give 90 degrees of phase difference between the polarization parallel to its optical axis and the orthogonal polarization.

It is to be understood that the above description of the present invention is susceptible to various modifications, changes and adaptations, and the same are intended to be comprehended within the meaning and range of equivalents of the appended claims.

REFERENCES

1. R. B. Dyott, et. al., Preservation of polarization in optical fiber waveguides with elliptical cores, Electronics Letters 15 (B), p. 380–382 (1979).
2. V. Ramaswamy, et. al., Birefringence in elliptically clad borosilicate single-mode fibers, Applied Optics 18 (24), p. 4080–4084 (1979).
3. R. A. Sammat, Birefringence in graded-index fibers with elliptical cross-section, Electronics Letters 16 (4), p. 156–157 (1980).

The embodiments of the invention in which an exclusive property or privilege is claimed are defined as follows:

1. In an arrangement including a strip diode laser having an optical fiber coupled to its output for transmission of the output signals of said laser the improvement comprising means, inserted between said output of said laser and input of said optical fiber, for converting the linearly polarized wave at said output of said laser to a circularly polarized wave at said input of said optical fiber.

2. The arrangement defined in claim 1 wherein said means comprises a λ/4 disc, said disc having an optical axis which lies transverse to the axis of the laser-fiber system and forms an angle of 45° with the sides of the strip cross section of said laser, and having a 90° phase difference between polarizations perpendicular and parallel to said optical axis.

3. The arrangement defined in claim 1 wherein said means comprises a section of connecting fiber which is doubly refracting and has a transverse optical axis which forms an angle of 45° with the sides of the strip cross section of said laser and a length and index of refraction such that there exists a 90° phase difference between the polarizations perpendicular and parallel to this optical axis.

4. An arrangement as defined in claim 3 wherein said optical fiber which follows said connecting fiber is a single mode fiber, and wherein said connecting fiber is doubly refracting for the fundamental wave of said single mode fiber.

5. An arrangement as defined in claim 3 wherein said connecting fiber is doubly refracting due to internal mechanical stresses.

6. An arrangement as defined in claim 3 or 4 wherein said connecting fiber has an oval core cross section whose largest diameter is rotated by 45° with respect to the sides of the strip cross section of said laser to form said angle.

7. An arrangement as defined in claim 3 wherein: said optical fiber which follows said doubly refracting connecting fiber is a multimode fiber; said connecting fiber is a gradient fiber; and, the spot size of the fundamental wave of said gradient fiber is adapted to the output beam of said laser.

* * * * *